United States Patent [19]

Houghtaling et al.

[11] Patent Number: 4,765,681
[45] Date of Patent: Aug. 23, 1988

[54] SEAT BACK RECLINER WITH CABLE RELEASE

[75] Inventors: Bruce Houghtaling, Battle Creek; Harry H. White, Richland, both of Mich.

[73] Assignee: Keiper Recaro Incorporated, Battle Creek, Mich.

[21] Appl. No.: 33,672

[22] Filed: Apr. 3, 1987

[51] Int. Cl.⁴ ............................................... B60N 1/02
[52] U.S. Cl. ..................................... 297/367; 297/379
[58] Field of Search ................ 297/367, 368, 369, 379

[56] References Cited

U.S. PATENT DOCUMENTS

| | | | |
|---|---|---|---|
| 2,310,476 | 2/1943 | Todd | 297/367 X |
| 3,788,698 | 1/1974 | Perkins | 297/367 X |
| 3,931,996 | 1/1976 | Yoshimura | 297/367 X |

Primary Examiner—James T. McCall
Attorney, Agent, or Firm—Lloyd M. Forster

[57] ABSTRACT

Vehicle seat adjustable recliner hinge assembly employing toothed sector, pivoted toothed pawl and retractable pivoted eccentric cam resiliently urged to pawl engaging sector retaining seat backadjusted position, characterized by a remote lever actuated flexible cable release connection for said cam for applying cable tension at an effective cam actuating radial moment arm relative to the cam pivot in a direction opposite to the resilient biasing.

5 Claims, 4 Drawing Sheets

4,765,681

SEAT BACK RECLINER WITH CABLE RELEASE

BACKGROUND OF THE INVENTION

Hinge fittings such as disclosed in U.S. Pat. Nos. 3,999,247 and 4,223,947 are known in the art for a vehicle seat having an adjustable tiltable backrest member with pivotally connected hinge members, including a seat back bracket having a toothed sector engaged by a toothed pawl pivotally mounted on a seat bracket and held in locked engagement by a cam also pivotally mounted on the seat bracket. The cam has a limited pawl engagement face having an intermediate operative range when all lost motion is taken up through the teeth in self-locking interengagement covering the extremities of all tolerance possibilities of the interengaging elements and with irreversible self-locking action against cam disengagement under any vibration or backrest tilting pressure in any direction. The cam is biased toward an engaging position by resilient spring means and is moved to a release position by a handle mounted on a cam pivot shaft adapted to overcome the spring bias and move the cam to release position under manual actuation.

Such release handle arrangement requires manual actuation in direct proximity with the cam location in the hinge bracket, which is not always in a convenient position for the seat occupant. In order to accommodate manual release actuation at a location remote from the cam, bracket extensions have been devised for pivotal handle mounting spaced from the cam pivot with linkage extending between the handle mounting and the cam actuated by the handle. Examples are disclosed in copending applications, Ser. No. 651,911 filed on Sept. 19, 1984 and Ser. No. 687,954 filed on Dec. 31, 1984 which have been assigned to Keiper Recaro, Inc., owner of the present application. While such bracket extension provisions for pivotal mounting of the release handle accommodate convenient manual actuation adequate for certain installation as an integral part of the hinge construction, the need and customer desire for even more convenient actuation, e.g., with manual release levers installed in central armrests such as available in some recreational vehicles, has led to the consideration of cable releases which would accommodate manual actuation from any desired location remote from the hinge cam. Certain attempts have been made to provide such cable release by attachments at a remote pivot for a conventional release handle adapted to actuate a linear slidable toothed pawl engageable with a toothed sector. However, such attempts have not been entirely satisfactory, in failing to provide the dependable action of a pivoted cam for locking a pivoted pawl in the adjusted position of the seat back.

SUMMARY OF THE INVENTION

The present invention adapts a flexible cable to actuate a cam similar to that disclosed in said aforementioned patents through manual actuation of a remote lever which may be mounted in any position convenient to the occupant such as on a central armrest or otherwise.

In one embodiment, a flat cam per se is provided with an edge slot leading to a circular aperture which confines a circular knob at the end of a flexible cable wire, with an adjacent surface of the bracket on which the cam is pivotally mounted serving to provide a reaction mounting for the end of the flexible cable housing. A torque spring mounted on the pivot shaft for the cam serves to bias the cam toward pawl retaining engagement as previously employed with a conventional handle for actuating the shaft to release the cam.

In a second embodiment, a lever is secured on an extension of the cam pivot shaft in place of the actuating handle, and the end of the flexible cable is secured to the lever with a reaction shoulder for the end of the cable housing pierced as a tab from one side plate of the seat bracket at a position appropriate to actuate the lever shaft and cam to a release position.

DETAILED DESCRIPTION OF THE DRAWINGS

Figure 1:
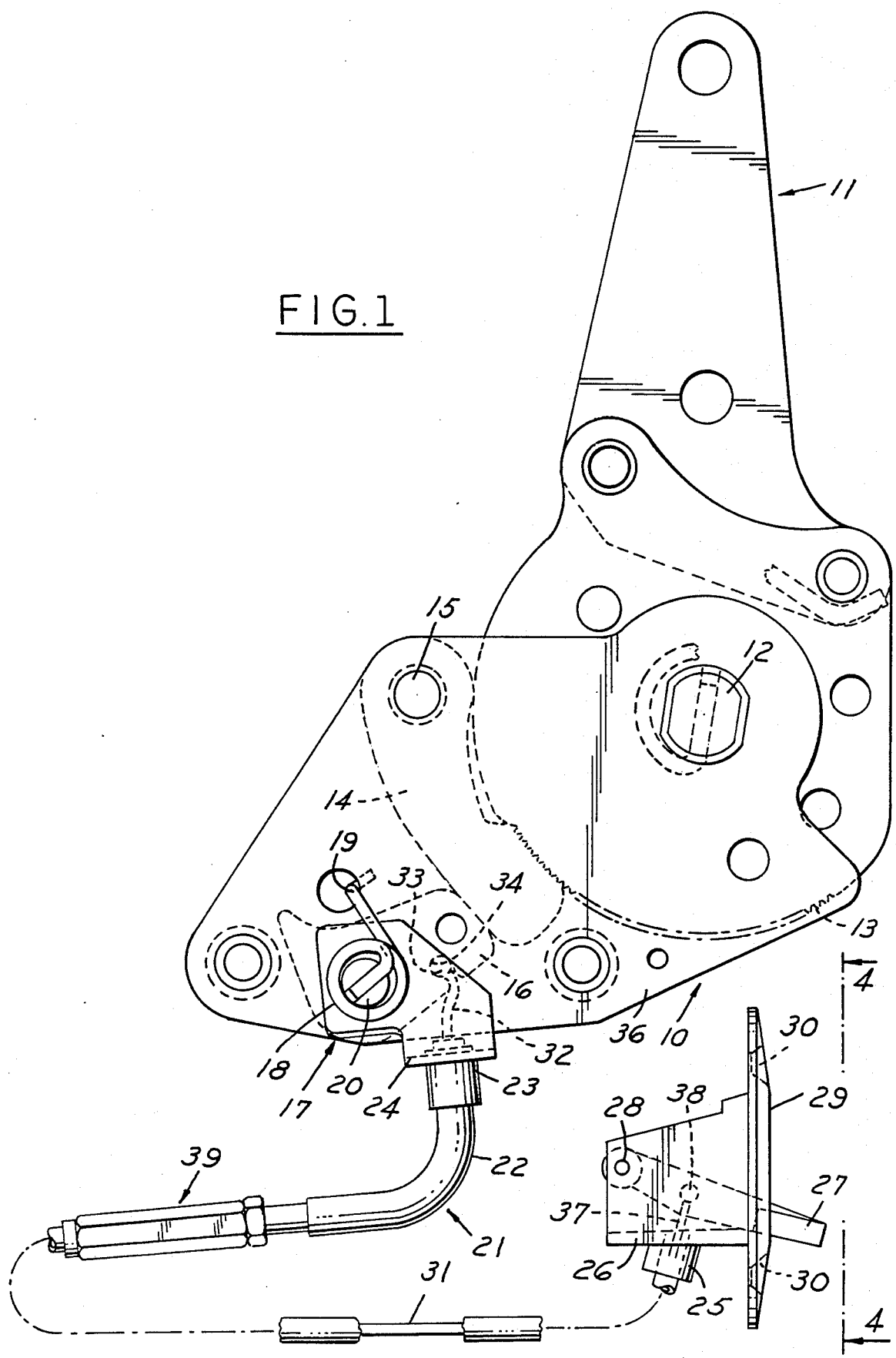
FIG. 1 is a side elevation of a first embodiment of the hinge assembly of the present invention.
Figure 2:
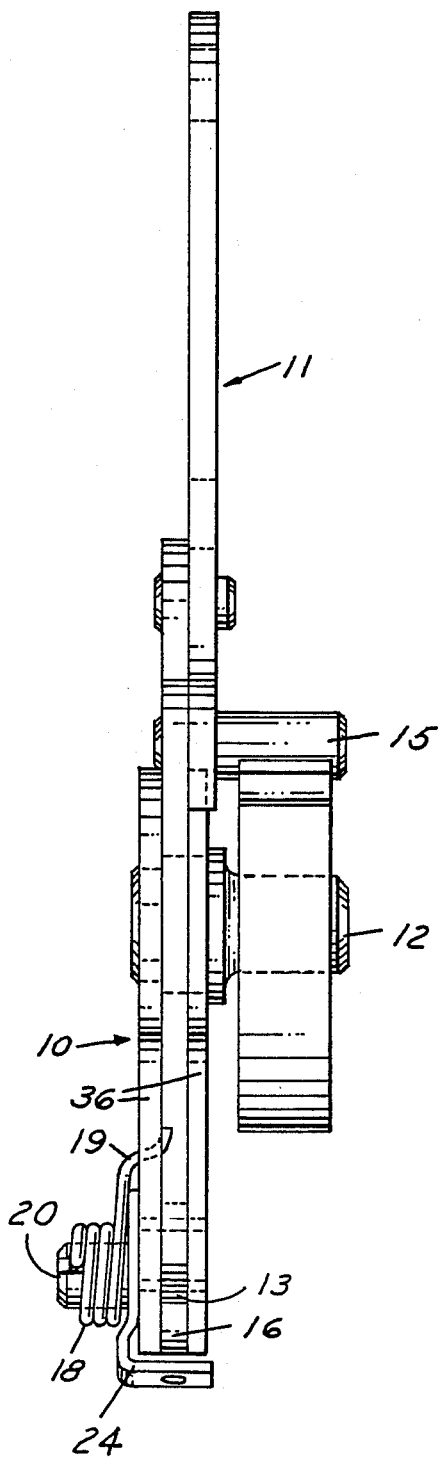
FIG. 2 is an end view of the hinge shown in FIG. 1.
Figure 3:
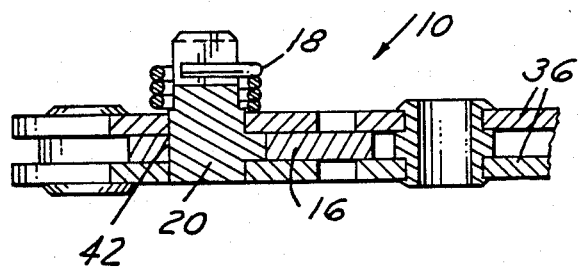
FIG. 3 is a sectional view taken along the line 3—3 of FIG. 1.
Figure 4:
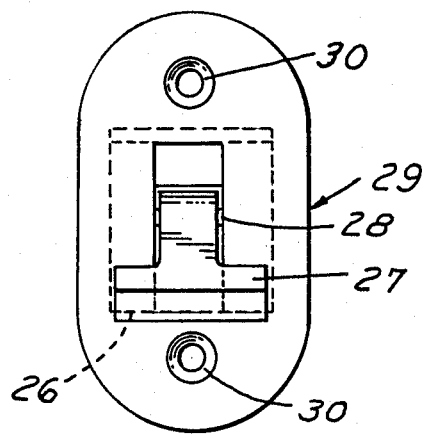
FIG. 4 is a face view of the remote control lever taken along the line 4—4 of FIG. 1.

With reference to FIG. 1, the seat back recliner hinge assembly of the present invention includes seat mounting bracket 10, seat back mounting bracket 11 pivotally connected at 12 to seat bracket 10 and including toothed sector 13 engageable by toothed pawl 14 pivotally connected at 15 to seat bracket 10, said pawl being retained in any adjusted position of bracket 11 by cam 16 pivotally mounted on shaft 20 between side plates 36 at 17 to seat bracket 10.

Cam 16 is biased toward seated position, for holding pawl 14 in retaining engagement with sector 13, by torque spring 18 anchored at 19 to seat bracket 10 with its other end in actuating engagement with release shaft 20 drivingly secured to cam 16.

Release cable 21 includes tubular housing 22 having reaction end 23 secured to clip 24 mounted on bracket 10 under torque spring 18. Remote reaction end 25 of cable tube 22 is secured to housing 26 for mounting release lever 27 with pivotal connection at 28. Housing 26 is adapted for remote mounting such as on an armrest, not shown, with flange 29 having extensions with holes 30 for armrest attachment screws. Flexible tension cable 31, slidable within tube 22 has exposed end 32 fitted with circular knob 33 engaging circular aperture 34 in cam 16, best illustrated in FIG. 5, with narrowed opening 35 serving to admit flexible cable end 32 and restain knob 33 against withdrawal with spaced side plates 36 of seat bracket 10 serving to retain knob 33 from lateral disengagement. Similar connection for exposed cable end 37 is provided at 38 to release lever 27 which is adjusted to eliminate lost motion by tube adjuster 39 so that actuation of release lever 27 will tension release cable 31 to withdraw cam 16 in a clockwise direction as shown in FIG. 1 from engagement with pawl 14 against the resistance of torque spring 18.

Figure 5:
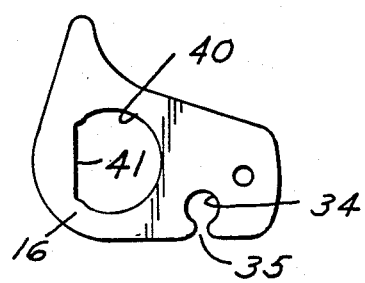
FIG. 5 is an enlarged detailed view of the cam per se illustrated with broken line in FIG. 1.
Figure 6:
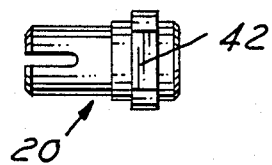
FIG. 6 is an enlarged side elevation of the release shaft per se illustrated in FIGS. 1, 2 and 3.

With further reference to FIG. 5, cam 16 is provided with drive aperture 40 having flat 41 engaged by flat 42 of release shaft 20 best illustrated in FIG. 6.

Figure 7:
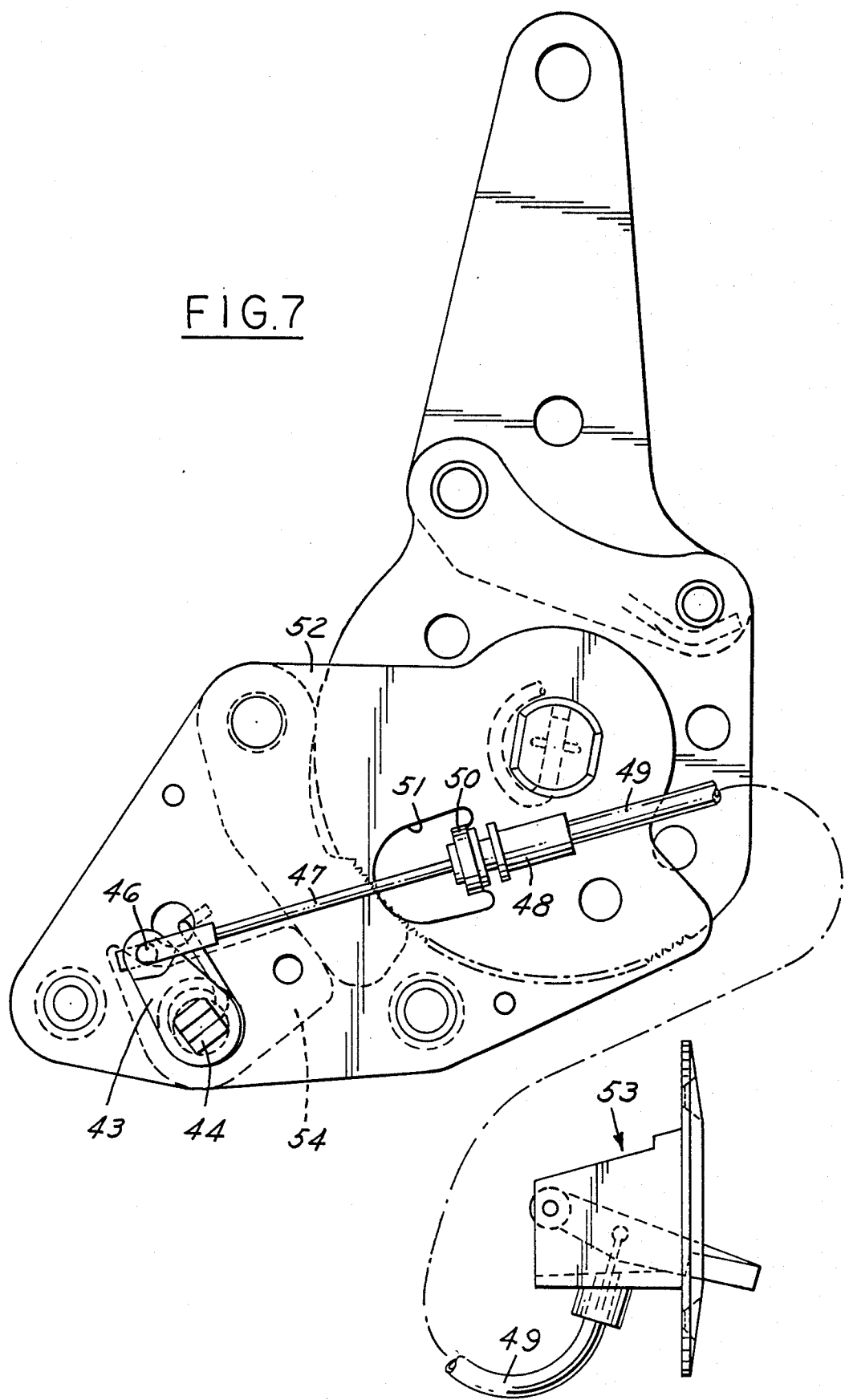
FIG. 7 is side elevation of a modified embodiment corresponding to FIG. 1.
Figure 8:
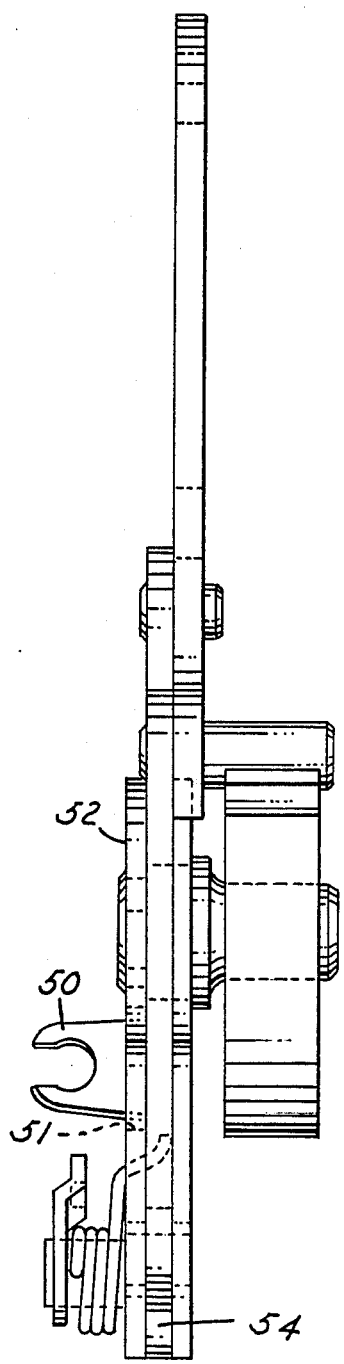
FIG. 8 is an end view of the FIG. 7 embodiment corresponding to FIG. 2.
Figure 9:
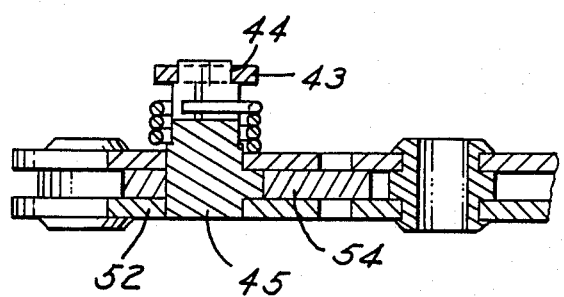
FIG. 9 is a fragmentary sectional view taken along the line 9—9 of FIG. 7 corresponding to FIG. 3 of the first embodiment.

With reference to FIGS. 7-9, illustrating the modified embodiment, external lever 43 is drivingly mounted on squared end extension 44 of release shaft 45 actuated by cable connection 46 at the end of cable extension 47 projecting from reaction fitting 48 of cable tube 49 secured to tab 50, pierced and formed to project from aperture 51 in side plate 52 of the seat bracket. Mounting for release lever assembly 53 is the same as for the first embodiment and release actuation is the same in each case with the exception that cam 54 in the second embodiment does not include the aperture 34 of the first embodiment for cable release connection being actuated instead through exterior lever 43 as previously described. In each case, the flexible cable release acts on a radial moment arm relative to the cam pivot and may be adapted to provide a release lever location wherever desired such as on a central armrest or any convenient accessible location on the seat.

What is claimed is:

1. Vehicle seat adjustable recliner hinge assembly comprising a seat bracket, a seat back bracket pivotally connected to said seat bracket, a toothed sector on said seat back bracket engageable in any adjusted position by a toothed pawl pivotally mounted on said seat bracket, an eccentric cam pivotally mounted on said seat bracket releasably engageable with said pawl to retain it and said seat back bracket in adjusted position, resilient means pivotally biasing said cam into pawl retaining engagement, said cam comprising a planar element extending between a pair of seat bracket side plates having a torque transmitting pivot shaft extending therethrough with a projecting end, said resilient means comprising a torque spring mounted on said projecting end with a reaction end engaging one of said side plates and manual means for releasing said cam to accommodate release of said pawl for seat back adjustment, characterized by a flexible release cable means having a reaction mounting on said seat bracket in close proximity to said cam, a cable housing reaction tube secured at said reaction mounting, a cable connection means for applying cable tension at an effective cam actuating radial moment arm relative to said cam pivot in a direction opposite to said biasing, and a remotely mountable manual release lever means with actuating connection to a remote end of said cable for applying cam releasing cable tension at said cable connection means, said reaction tube including an intermediate tube adjuster to eliminate lost motion in the effective actuation of said manual release lever.

2. Hinge assembly of claim 1 wherein said cable connection means comprises a direct connection to said cam per se for exerting cable tension at said radial moment arm, said direct connection comprising an aperture extending through said cam with a narrowed cable passage to a side edge of said cam, and the end of said cable being provided with an enlarged head fitting in said aperture and retained by the sides of said narrow passage.

3. Hinge assembly of claim 2 including a mounting clip on a side edge of seat bracket forming said reaction mounting.

4. Hinge assembly of claim 1 and a lever secured to said projecting end forming said cam actuating radial moment arm, said cable connection means being attached to said lever to apply said cable tension.

5. Hinge assembly of claim 4 wherein one of said side plates is provided with a projecting pierced tab comprising said reaction mounting.

* * * * *